(12) United States Patent
Formenti et al.

(10) Patent No.: US 12,407,265 B2
(45) Date of Patent: Sep. 2, 2025

(54) SWITCHING FREQUENCY CONTROL FOR INTEGRATED RESONANT HALF-BRIDGE ISOLATED DC/DC WITH BURST MODE OPERATION

(71) Applicant: TEXAS INSTRUMENTS INCORPORATED, Dallas, TX (US)

(72) Inventors: Jose V. Formenti, Dallas, TX (US); Robert Martinez, Lucas, TX (US); Michael Corry, Dallas, TX (US); Sombuddha Chakraborty, Redwood City, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 559 days.

(21) Appl. No.: 17/898,916

(22) Filed: Aug. 30, 2022

(65) Prior Publication Data
US 2024/0072675 A1    Feb. 29, 2024

(51) Int. Cl.
*H02M 3/335* (2006.01)
*H02M 1/00* (2006.01)
*H02M 3/00* (2006.01)

(52) U.S. Cl.
CPC ..... *H02M 3/33576* (2013.01); *H02M 1/0035* (2021.05); *H02M 3/01* (2021.05)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538;
(Continued)

(56) References Cited

U.S. PATENT DOCUMENTS 7,133,300 B1   11/2006  Yang
7,759,917 B2 *  7/2010  Ishino ................ H02M 3/1584
                                              323/272
(Continued)

FOREIGN PATENT DOCUMENTS

JP   2017192281 A   10/2017
KR    100867452 B1  11/2008
WO   2016094389 A2   6/2016

OTHER PUBLICATIONS

PCT Search Report dated Dec. 20, 2023.

*Primary Examiner* — Jeffrey A Gblende
(74) *Attorney, Agent, or Firm* — Charles F. Koch; Frank D. Cimino

(57) ABSTRACT

A system includes a control circuit having a voltage input and a control circuit output. The control circuit produces a control voltage at the control circuit output having a magnitude inversely related to a magnitude of an input voltage at the input voltage input. A VCO has a VCO control input and a VCO clock output. The VCO control input is coupled to the control circuit output. The VCO produces a VCO clock on the VCO clock output having a frequency that is a function of the control voltage. A protection circuit has a first clock input, a second clock input, and a protection circuit output. The second clock input is coupled to the VCO clock output. The protection circuit generates a protection circuit output signal at the protection circuit output based on a difference in frequency between a clock signal at the first clock input and the VCO clock.

20 Claims, 7 Drawing Sheets

(58) Field of Classification Search
CPC ......... H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; H02M 5/2573; H02M 1/081; H02M 5/293; H02M 7/12; H02M 3/10; H02M 3/125; H02M 3/13; H02M 3/135; H02M 3/145; H02M 3/15; H02M 3/156; H02M 3/157; H02M 3/158; H02M 1/346; H02M 3/1588; H02M 2003/1566; H02M 3/1584; H02M 2003/1557; H02M 1/0032; H02M 1/4225; H02M 7/217; H02M 1/0025; H02M 1/0045; H02M 1/0009; H02M 1/088; Y02B 70/1491; G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H05B 39/048; B23K 11/24; H04B 2215/069

See application file for complete search history.

(56) References Cited

U.S. PATENT DOCUMENTS

| | | | | |
|---|---|---|---|---|
| 9,602,012 | B2* | 3/2017 | Kawashima | H02M 1/32 |
| 9,853,573 | B2* | 12/2017 | Siri | H02M 1/12 |
| 10,305,362 | B2* | 5/2019 | Nakajima | H02M 1/08 |
| 2016/0359418 | A1 | 12/2016 | Kawashima | |

* cited by examiner

SWITCHING FREQUENCY CONTROL FOR INTEGRATED RESONANT HALF-BRIDGE ISOLATED DC/DC WITH BURST MODE OPERATION

BACKGROUND

A voltage converter is an electrical circuit (e.g., an integrated circuit, "IC") that receives an input voltage at one voltage level and generates an output voltage typically at a different voltage level. Some voltage converters are isolated converters which include a galvanic barrier between the input and the output. A galvanic isolation barrier lacks a direct electrical connection between circuitry on one side of the barrier to circuitry on the other side of the barrier. One type of galvanic isolation barrier is a transformer, which has two inductors—a primary coil for the input side of the converter and a secondary coil for the output side of the converter—and there is no direct electrical connection between the primary and secondary coils. Isolated voltage converters have a wide variety of applications such as in controller area networks (CANs), power supply start-up bias and gate drives, isolated sensor interfaces, etc.

SUMMARY

In one example, a system includes a control circuit having a voltage input and a control circuit output. The control circuit is configured to produce a control voltage at the control circuit output having a magnitude inversely related to a magnitude of an input voltage at the input voltage input. A voltage-controlled oscillator (VCO) has a VCO control input and a VCO clock output. The VCO control input is coupled to the control circuit output. The VCO is configured to produce a VCO clock on the VCO clock output having a frequency that is a function of the control voltage. A protection circuit has a first clock input, a second clock input, and a protection circuit output. The second clock input is coupled to the VCO clock output. The protection circuit is configured to generate a protection circuit output signal on the protection circuit output based on a difference in frequency between a clock signal on the first clock input and the VCO clock.

BRIEF DESCRIPTION OF THE DRAWINGS

For a detailed description of various examples, reference will now be made to the accompanying drawings in which.

DETAILED DESCRIPTION

The example embodiments described herein are directed to a voltage converter. In one example, the voltage converter is an isolated voltage converter including a transformer that isolates a "primary" side from a "secondary" side of the converter. The isolated voltage converter is configured to convert an input direct current (DC) voltage (VIN) received on the primary side to a different (or the same) DC voltage (VOUT) on the secondary side using the transformer. The primary side includes a control and power stage that may include a power stage that receives the DC input voltage and produces a time-varying voltage to the primary winding of the transformer. The time-varying voltage on the primary winding of the transformer induces a time-varying current/voltage in the secondary winding of the transformer. The secondary side includes a rectifier to convert the time-varying current/voltage from the secondary winding to an approximately DC output voltage, VOUT.

Figure 1:
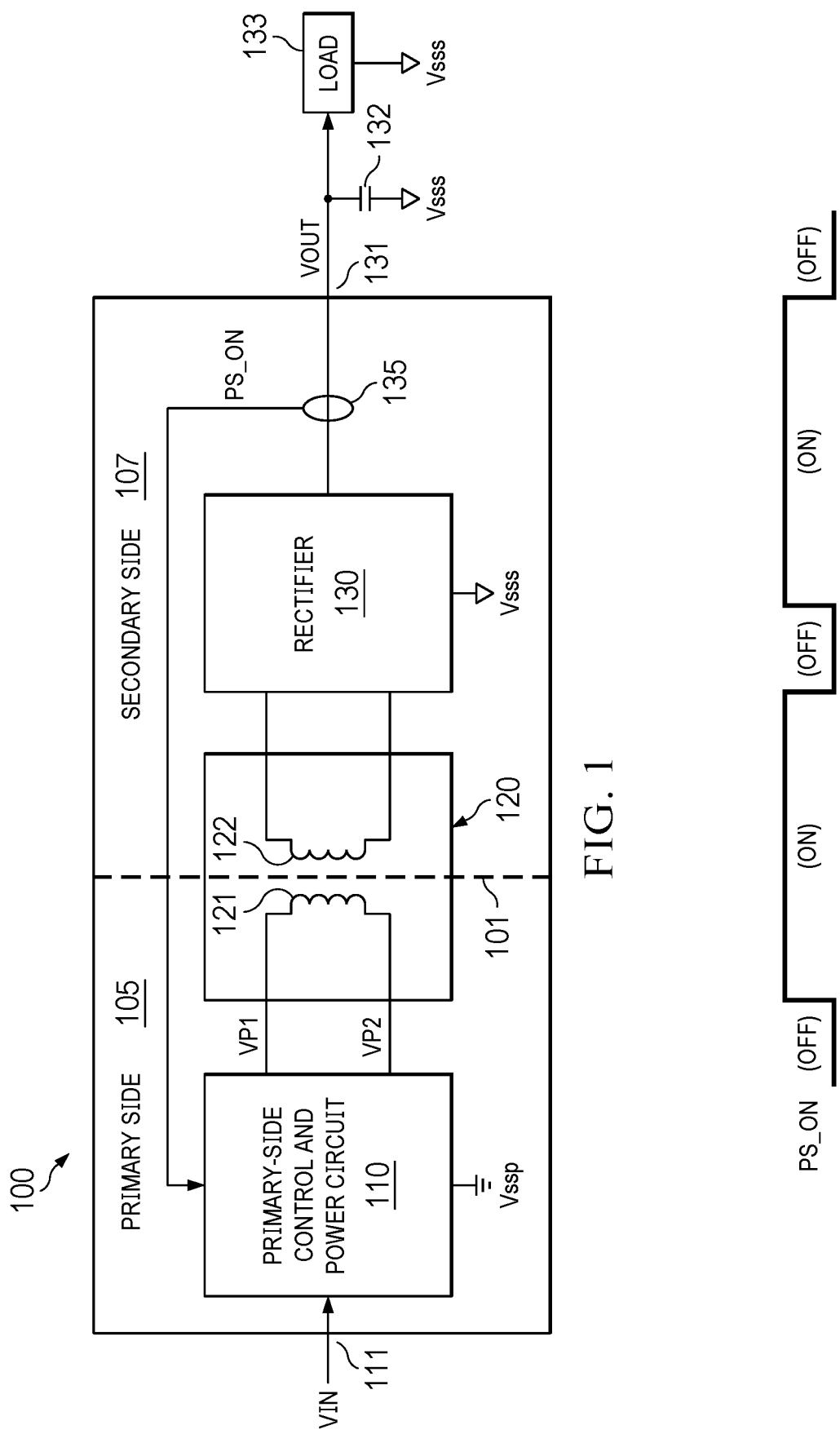
FIG. 1 is a schematic diagram of a quasi-resonant voltage converter, in an example.

FIG. 1 is a block diagram of system that includes an isolation voltage converter 100 (e.g., a quasi-resonant voltage converter) in an example embodiment. The isolation voltage converter 100 has a primary side 105 and a secondary side 107. The isolated voltage converter 100 includes a transformer 120 that is operable as an isolation transformer to galvanically isolate the primary side 105 from the secondary side 107. The dashed line 101 delineates the primary side 105 from the secondary side 107. No electrical connection is present between the primary and secondary sides. The terms "primary" and "secondary" refer to the primary and secondary inductors (also referred to as coils or windings) of the transformer 120.

The primary side 105 includes a voltage input 111. The DC input voltage provided to the voltage input 111 is VIN. The secondary side 107 includes a voltage output 131. The isolated output voltage from the voltage output 131 is VOUT. The output of the rectifier 130 is coupled to an output capacitor 132 and to a load 133. The primary side 105 includes a primary-side control and power stage 110. The secondary side 107 includes a rectifier 130. In one example, the rectifier 130 is a full-bridge rectifier comprising four diodes, although other implementations of the rectifier are possible as well. The primary side 105 has a ground Vssp. The secondary side 107 has a ground Vsss. The grounds Vssp and Vsss are isolated from each other.

The transformer 120 has a primary winding 121 and a secondary winding 122. The primary-side control and power stage 110 receives Vin, and switch nodes VP1 and VP2 of the primary-side power are coupled to the terminals of the primary winding 121 of the transformer 120 as shown. The rectifier 130 is coupled to the secondary winding 122 of the transformer 120. The rectifier 130 converts the time-varying voltage from the secondary winding 122 of the transformer to the DC output voltage VOUT. The voltages VIN and VOUT do not share the same ground and are galvanically isolated from each other.

The isolation voltage converter 100 regulates the voltage level of VOUT. In one embodiment, a feedback signal, PS_ON, is provided from the secondary side 107 to the primary side 105 to turn ON and OFF a power stage within the primary-side control and power circuit 110. PS_ON may be transmitted from the secondary side 107 to the primary side 105 through the transformer 120 (or another suitable galvanically-isolated data channel). The secondary side 107 may include a sense circuit 135 to sense, for example, the magnitude of VOUT. In one embodiment, the sense circuit 135 asserts PS_ON to a first logic state (e.g., logic high) responsive to VOUT falling below a lower threshold level and asserts PS_ON to a second, opposite logic state (e.g., logic low) responsive to VOUT increasing above an upper threshold level. The voltage difference between the upper and lower threshold levels represents the output voltage ripple. Responsive to an assertion (e.g., logic high) of PS_ON, the primary-side control and power circuit 110 turns ON its power stage (described below) to transfer energy through the transformer 120 to the rectifier 130, load 133, and output capacitor 132 to thereby cause VOUT to increase (e.g., ramp up). In one embodiment, responsive to a deassertion (e.g., logic low) of PS_ON, the primary-side control and power circuit 110 may turn OFF the power stage to cease the transfer of energy through the transformer 120 to the rectifier 130 to thereby cause VOUT to decrease (e.g., ramp down) as the output capacitor 132 discharges while supplying power to the load 133. In the embodiments described herein, the primary-side control and power circuit 110 turns OFF the power stage at higher voltage levels of VIN even before the PS_ON signal is deasserted to reduce the output power level to a safer level.

Figure 2:
FIG. 2 is a timing diagram of a signal used in the quasi-resonant voltage converter in an example.

FIG. 2 provides an example timing diagram for PS_ON. When PS_ON is low, the primary-side control and power circuit 110 turns off its power stage. When PS_ON is high, the primary-side control and power circuit 110 uses a relatively high frequency clock with its power stage to create a high frequency switching waveform between switch nodes VP1 and VP2.

Figure 3:
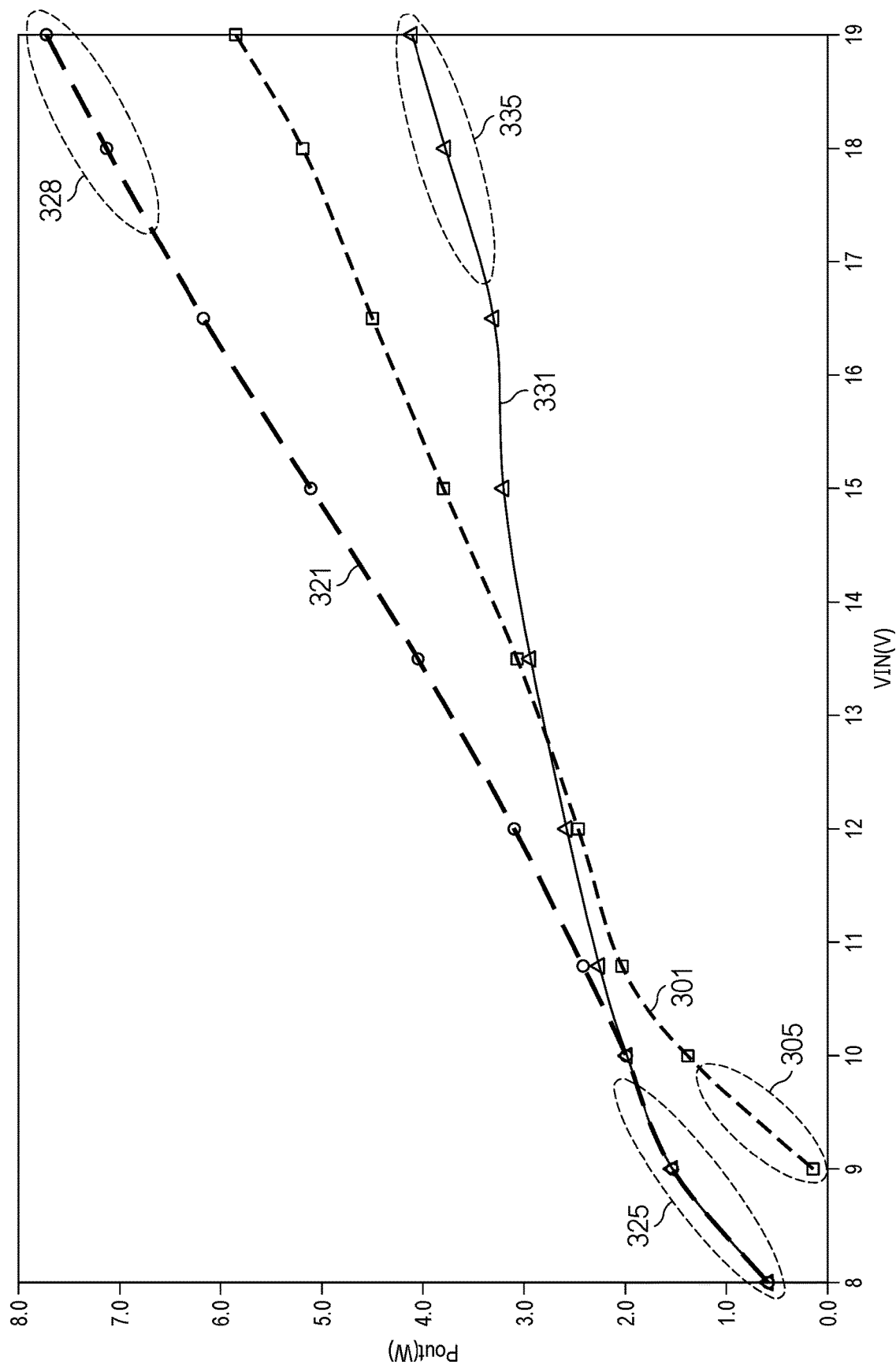
FIG. 3 are graphs illustrating the relationship between input voltage to the converter, switching frequency, and maximum output power, and the benefit of the described examples in increasing the maximum output power at lower levels of input voltage and limiting the maximum output power at higher levels of input voltage, in the described embodiments.

FIG. 3 includes graphs 301, 321, and 331. The y-axis is the maximum output power that the converter can produce, and the x-axis is VIN. Graph 301 relates output power to VIN assuming a fixed frequency for the switching waveform between switch nodes VP1 and VP2. Graph 301 shows that as VIN increases, the output power also increases. A problem with an implementation in which the switching frequency for the power stage has a fixed frequency is illustrated by graph 301 in which at lower levels of VIN (e.g., as identified by reference numeral 305), the maximum output power is relatively low. In the example of FIG. 3, at VIN equal to 9 V, the maximum output power is about 0.1 W. Such low levels of output power may not be sufficient to power a load (e.g., load 133).

Graph 321 illustrates a relationship between the maximum output power and VIN for a quasi-resonant voltage converter which inversely varies the switching frequency with respect to VIN. As VIN increases, the switching frequency decreases. With such an implementation, the maximum output power from the converter is larger at any given VIN than for the implementation using a fixed switching frequency (graph 301), all else being equal. The variable switching frequency implementation advantageously results in higher levels of the maximum output power at lower levels of VIN (see reference numeral 325 compared to reference numeral 321), thereby providing adequate levels of available output power even at lower levels of VIN.

However, a problem with a quasi-resonant converter that inversely varies the switching frequency with respect to VIN through all rated levels of VIN is that at higher levels of VIN (see reference numeral 328), the maximum output power may be dangerously high in the event of a short-circuit of the output of the converter (e.g., VOUT shorted to ground). In the example of FIG. 3, the maximum output power at VIN equal to 19 V is approximately 7.8 W. If VOUT were to be unintentionally shorted to ground, the power delivered through the converter would likely damage the converter and possibly other components mounted on the same circuit board as the converter.

The embodiments described herein are directed to a primary-side control and power circuit 110 that results in graph 331. At lower levels of VIN, the primary-side control and power circuit 110 inversely varies the switching frequency with respect to VIN, and thus graph 331 generally is coincident with graph 321 at lower levels of VIN (e.g., VIN less than approximately 10 V in the example of FIG. 3). At levels of VIN above 10 V (in this example), the primary-side control and power circuit 110 includes additional OFF time each time the primary side turns ON its power stage, thereby reducing the duty cycle of the converter and limiting the maximum power as shown by graph 331 (reference numeral 335) above 10 V relative to graphs 321 and 301.

Figure 4:
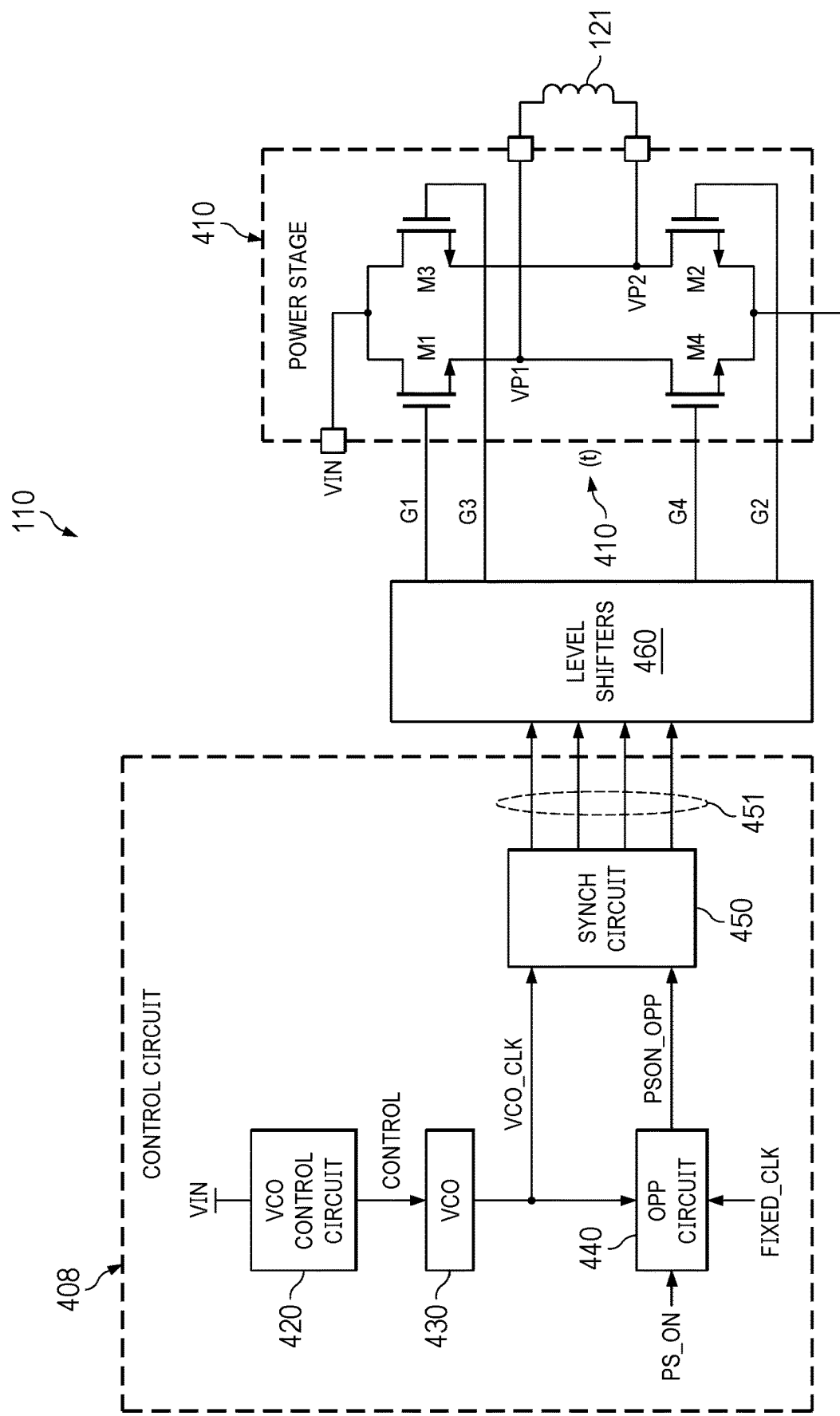
FIG. 4 is a schematic diagram of the primary-side control and power stage circuit of the quasi-resonant voltage converter including a voltage-controlled oscillator control circuit and an over-power protection circuit, in the described embodiments.

FIG. 4 is a circuit schematic illustrating an implementation of the primary-side control and power circuit 110. The primary-side control and power circuit 110 includes a control circuit 408 coupled to a power stage 410 through level shifters 460. The control circuit 408 in this example includes a variable-controlled oscillator (VCO) control circuit 420, a VCO 430, an over-power protection (OPP) circuit 440, and a synchronization (synch) circuit 450. The VCO control circuit 420 receives VIN and generates an output signal CONTROL to the VCO 430. In the described embodiments, CONTROL is an analog voltage that is inversely proportional to VIN. The VCO 430 receives CONTROL as an input signal and produces an output clock (VCO_CLK) whose frequency is governed by CONTROL—the larger is CONTROL, the higher is the frequency of VCO_CLK, and vice versa. Accordingly, VCO_CLK is a variable frequency clock signal whose frequency varies inversely with respect to VIN.

In one embodiment, the components of the control circuit 408, VCO control circuit 420, VCO 430, OPP circuit 440, and synch circuit 450 are fabricated as an integrated circuit on a common die. In other embodiments, some of the components of the control circuit may be fabricated on different dies. The power stage 410 may be on one of the aforementioned dies, or on a separate die.

The OPP circuit 440 receives PS_ON, a fixed frequency clock signal (FIXED_CLK), and VCO_CLK as inputs and generates an output signal PSON_OPP as described herein. PSON_OPP is a digital signal and is at one of two digital states. For example, at a logic high, PSON_OPP causes the synch circuit 450 to use VCO_CLK to generate gate control signals 451 for switching transistors within the power stage 410. The switching frequency of the power stage 410 is controlled by the frequency of VCO_CLK. Because the frequency of VCO_CLK is inversely related to VIN, the switching frequency also is inversely related to VIN.

The level shifters 460 level shift the gate control signals 451 to suitable voltages to turn ON and OFF their respective switching transistors. The power stage 410 includes transistors M1, M2, M3, and M4. In this example, transistors M1-M4 are n-channel field effect transistors (NFETs) but can be implemented as other types of transistors in other implementations. The output signals G1, G2, G3, and G4 from the level shifters are the gate voltages for transistors M1, M2, M3, and M4, respectively, within the power stage 410.

When the power stage 410 is to be turned ON (e.g., PSON_OPP is asserted logic high to request the control circuit 408 to turn on the power stage 410), the synch circuit 450 responds by generating gate control signals 451 in such a manner to cause transistors M1 and M2 to be ON concurrently, while transistors M3 and M4 are OFF, and then to cause transistors M3 and M4 to be ON, while transistors M1 and M2 are OFF. The ON and OFF states of transistors M1-M4 repeat—transistors M1 and M2 ON (transistors M3 and M4 OFF), then transistors M3 and M4 ON (transistors M1 and M2 OFF), then transistors M1 and M2 ON again (transistors M3 and M4 OFF), and so on. By controlling the ON/OFF state of the transistors M1-M4 in this manner, a switching voltage waveform is created on the switch nodes VP1 and VP2 to the primary winding 121. When PSON is forced low by the secondary side, the synch circuit 450 responds by turning ON transistors M2 and M4 (and turning OFF transistors M1 and M3) to discontinue the switching waveform and thus discontinue transferring energy through the transformer 120 to the secondary side 107.

Figure 5:
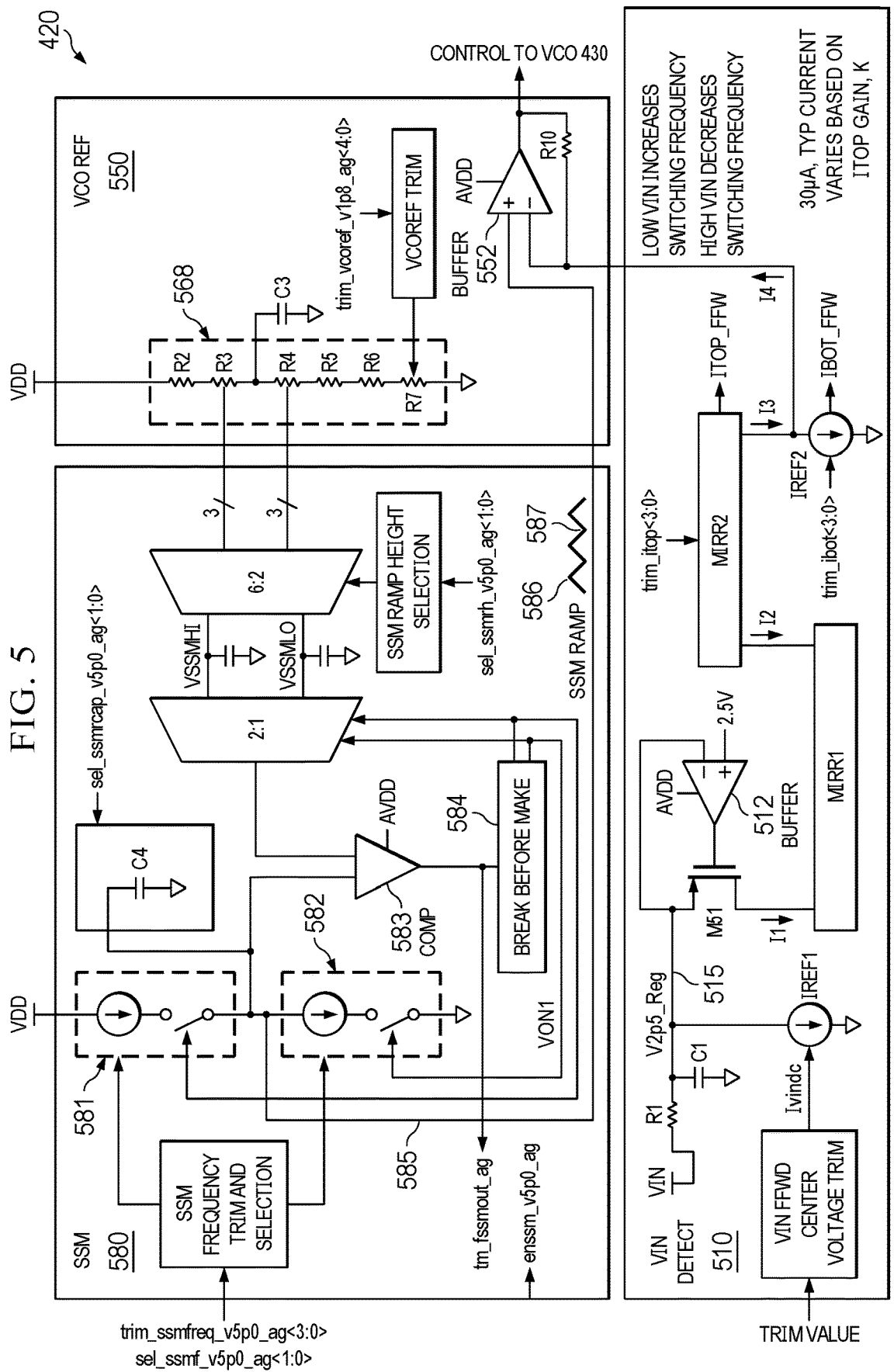
FIG. 5 is a schematic diagram of the voltage-controlled oscillator control circuit of FIG. 4, in the described embodiments.

FIG. 5 shows an example implementation for the VCO control circuit 420. In this example, the VCO control circuit 420 includes a VIN detect circuit 510, a VCO reference circuit 550, and a spread spectrum modulation (SSM) circuit 580. The VIN detect circuit 510 generates a current I4 that may be positive (in the direction of current flow as shown), 0 amperes, or negative (in the opposite direction). The VIN detect circuit 510 generates current I4 to increase (in a positive sense) as VIN increases. The current I4 is provided to the VCO reference circuit 550, which generates the CONTROL signal to the VCO 430. The SSM circuit 580 is included to reduce electromagnetic interference (EMI).

The VIN detect circuit 510 includes a resistor R1, a capacitor C1, current sources IREF1 and IREF2 (IREF1 and IREF2 refer both to the circuit that produces the reference currents as well as the magnitude of the reference currents), current mirrors MIRR1 and MIRR2, a transistor M51 (e.g., a p-channel field effect transistor, PFET), and a buffer 512 (e.g., an operational amplifier). Each of the current sources can be trimmed (e.g., by a value written to a register) to produce a fixed current level. One terminal of resistor R1 is coupled to VIN, and the other terminal of resistor R1 is coupled to the positive (+) input of buffer 502, to capacitor C1, to the current source IREF1, and to the source of transistor M51. The positive (+) input of buffer 512 is coupled to a voltage reference (2.5 V in this example but can be other than 2.5 V). The negative input of the buffer 512 also is 2.5 V because of there being zero or little voltage drop between the inputs of an operational amplifier. Accordingly, the buffer 512 regulates the voltage node 515 to be 2.5 V.

Current that flows through resistor R1 divides between IREF1 and transistor M51. Because IREF1 is a fixed current, the current through transistor M51 (current I1) is the difference between the current through resistor R1 and IREF. In other words, current I1 is [(Vin−2.5)/R1]−IREF1. Accordingly, as VIN increases, I1 increases, and as VIN decreases, I1 decreases. In one example, IREF1 is trimmed to a value of 6.5 micro-amperes (μA).

Current I1 is mirrored by current mirror MIRR1 (e.g., a combination of transistors configured as a current mirror) as current I2. In one example, the current mirror ratio implemented by current MIRR1 is 1:1, which means current I2 equals current I1. Current I2 is then mirrored by current mirror MIRR2 as current I3. The current mirror ratio (trimmable) implemented by current MIRR2 is 1:k, which means current I3 equals k times current I2. In one example, k is equal to 2, which means that current I3 is twice that of current I2.

Current I4 is the difference between currents I3 and IREF2. In one example, IREF2 is trimmed to a value of 30 pA. If I3 is greater than IREF2, then current I4 is a positive current (flowing in the direction of the arrow for I4) into resistor R10 (described below). The magnitude of the positive current I4 is a function of VIN. As VIN increases, more positive current I4 flows from left to right through resistor R10. If I3 is smaller than IREF2, then current I4 is a negative current. If I3 is equal to IREF2, then I4 is equal to 0 amperes and no current flows through resistor R10. In one example, the value of R1 is 1 MΩ, IREF1 and IREF2 are trimmed to be 6.5 μA and 30 μA, respectively, and k is trimmed to a value of 2. With these component values, I4 will be 0A when VIN is equal to 24 V. At levels of VIN greater than 24 V, current I4 will be positive with larger positive magnitudes at larger values of VIN. For example, at VIN equal to 28 V, current I4 will be equal to 8 μA. At levels of VIN smaller than 24 V, current I4 will be negative with larger negative magnitudes at smaller values of VIN. For example, at VIN equal to 20 V, current I4 will be equal to −8 μA.

The VCO reference circuit 550 includes buffer 552, capacitor C3, and resistors R2, R3, R4, R5, R6, R7, and R10. Resistors R2-R7 are connected in series between VDD (an internally generated and regulated supply voltage) and ground (AGND). Resistor R7 is trimmable, and is trimmed so that the CONTROL signal to the VCO 430 is set to a target level for a particular input voltage VIN when I4 is approximately 0 A. The series combination of resistors R2-R7 forms a resistor divider 568 to produce voltages VSSMHI from resistor R3 and VSSMLO from resistor R4 for the SSM circuit 580. The SSM circuit 580 produces a spread spectrum voltage ramp 585 to the positive input of buffer 552. The negative input of buffer 552 will also be equal to voltage ramp 585. Resistor R10 is coupled between the negative input of buffer 552 and the output of buffer 552. The current I4 flows in one direction or the other through resistor R10, depending on the magnitude of VIN, as described above. If current I4 is a positive current (flowing in the direction of the arrow for I4), a voltage drop will occur across resistor R10 with the voltage on the output of the buffer 552 being smaller than the voltage on the negative input of the buffer. The magnitude of the voltage drop is equal to the product of I4 and the resistance of resistor R10 (I4×R10). As current I4 becomes more negative, the voltage at the output of buffer 552 becomes larger relative to ground (AGND).

If current I4 is a negative current (with respect to the arrow for I4), a voltage drop also occurs across resistor R10 with the voltage on the output of the buffer 552 being larger than the voltage on the negative input of the buffer. The magnitude of the voltage drop is equal to I4×R10. The more negative that current I4 is, the larger will be the voltage on the output of buffer 552. The output voltage of buffer 552 is the CONTROL signal described above, which is provided to the VCO 430.

The SSM circuit 580 produces the spread spectrum voltage ramp 585. In one embodiment, the average level of the spread spectrum voltage ramp is equal to the voltage [(VSSMHI−VSSMLO)/2+VSSMLO] (the voltage divider voltage) from the voltage divider 568, with peak voltages 586 approximately 200 mV above the voltage divider voltage, and with valley voltage 587 approximately 200 mV below the voltage divider voltage. By modulating the voltage 585, which is also the voltage on the left-hand terminal of resistor R10, the VCO 430 will generate a frequency that will change linearly following voltage ramp 585 thereby generating less EMI compared to the use of a fixed voltage rather than a voltage ramp. The SSM circuit 580 includes switched current sources 581 and 582. When switched current source 581 is ON, current flows to charge capacitor C4 thereby causing the voltage across capacitor C4 to increase linearly (ramp up). When switched current source 582 is ON, current flows from capacitor C4, thereby discharging capacitor C4 and causing the voltage across capacitor C4 to decrease linearly (ramp down). The voltage across capacitor C4 is the spread spectrum ramp 585. A comparator 583 outputs a signal to a break-before-make circuit 584 to indicate when the spread spectrum ramp 585 has reached its peak 586 or its valley 587. The break-before-make circuit 584 turns ON and OFF the switched current sources 581 and 582 by first turning OFF the current source that is currently ON before turning ON the other current source.

Figure 6:
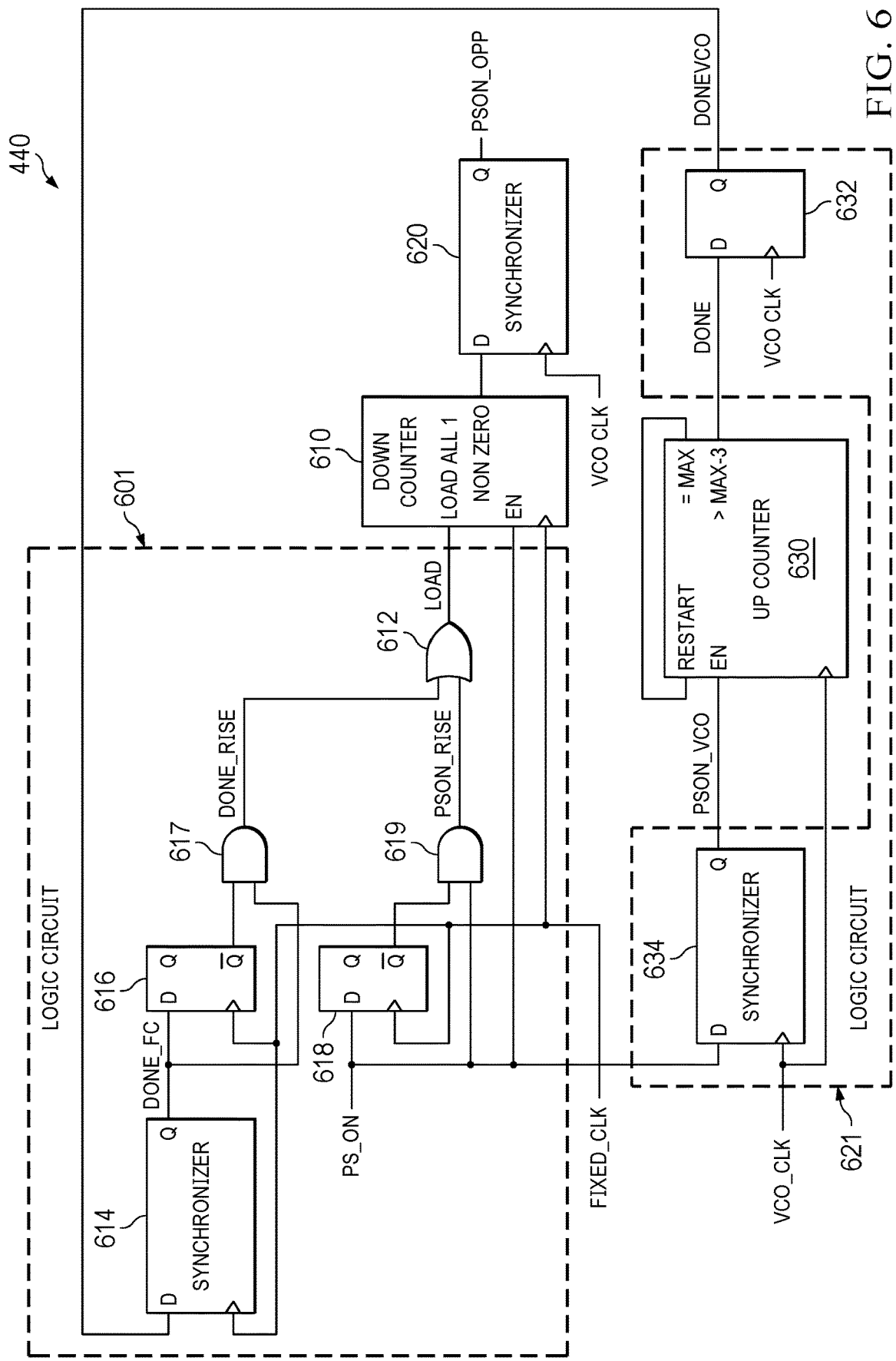
FIG. 6 is a schematic diagram of the over-power protection circuit of FIG. 4, in the described embodiments.

FIG. 6 is an example implementation of the OPP circuit 440. The OPP circuit 440 in this example includes a down counter 610, an up counter 630, logic circuits 601 and 621, and a synchronizer 620. The logic circuit 601 includes a synchronizer 614, data (D) flip-flops 616 and 618, AND gates 617 and 619, and an OR gate 612. Logic circuit 621 includes a synchronizer 634 and D flip-flop 632. The PS_ON signal is coupled to the D input of flip-flop 618, one input of AND gate 619, and synchronizer 634 and to the enable (EN) input of the down counter 610. When the EN input is asserted high, the down converter 610 is caused to count and when EN is low, the counting function of the down counter is disabled and its NON ZERO output is forced low. In another embodiment, counter 610 could be implemented as an up counter. The VCO_CLK is coupled to the clock inputs of synchronizer 620 and 634, the up counter 630, and the D flip-flop 632. The FIXED_CLK is coupled to the clock inputs of the down counter 610, the synchronizer 614, and flip-flops 616 and 618.

The synchronizers 614, 620, and 634 are included because of the existence of two separate clock domains in the OPP circuit 440. One clock domain is VCO_CLK and another clock domain is FIXED_CLK. For example, the D input of synchronizer 614 is generated based on the VCO_CLK, but the clock provided to the synchronizer 614 is the FIXED_CLK. The synchronizers prevent metastability problems when latching data generated in one clock domain with a clock of a different clock domain. In one embodiment, each synchronizer includes two serially-connected D flip-flops.

The Q output of synchronizer 614 (signal DONE_FC) is coupled to the D input of flip-flop 616 and one input of AND gate 617. The NOT Q output of flip-flop 616 is connected to the other input of AND gate 617, and the output of AND gate 617 (signal DONE_RISE, which pulses high for one FIXED_CLK cycle responsive to a rising edge of DONE_FC) is coupled to an input of OR gate 612. The NOT Q output of flip-flop 618 is connected to the other input of AND gate 619, and the output of AND gate 619 (signal PSON_RISE, which also pulses high for one FIXED_CLK cycle responsive to a rising edge of PS_ON) is coupled to another input of OR gate 612. The output of OR gate 612 (signal LOAD) is coupled to the LOAD ALL 1 input of the down counter 610, which in one embodiment is a 5-bit counter. In one example, responsive to LOAD being logic high, the down counter 610 loads its starting count value as all logic 1's. The output of the down counter 610 is labeled "NON ZERO", which is logic high (1) if any of the count bits are 1. If and when the down counter 610 reaches 0, the NON ZERO output becomes logic low (0). The NON ZERO output of the down counter 610 is coupled to the D input of synchronizer 620. The Q output of flip-flop 620 is the PSON_OPP signal shown in FIG. 4.

The Q output of synchronizer 634 (signal PSON_VCO) is coupled to the EN input of the up counter 630. When enabled (PSON_VCO is logic high), the up counter 630 increases its count value upon each rising edge of VCO_CLK. The up counter 630 has an EQUAL MAX output and a GREATER THAN OR EQUAL TO MAX-3 output. The EQUAL MAX output is logic low until the up counter reaches its terminal count value. In one embodiment, the up counter is a 6-bit counter that counts from 0 to 63 (decimal). Upon reaching a count value of 63, the EQUAL MAX output transitions from 0 to 1. The EQUAL MAX output is coupled to the restart input of the up counter. When the MAX output is asserted high, the up counter 630 resets its count value to 0 and begins counting again. The GREATER THAN OR EQUAL TO MAX-3 output (signal DONE) is logic low until the up counter's count value reaches its maximum value minus 3, which helps to ensure that the DONE signal from the up counter is longer than one VCO_CLK pulse. DONE is coupled to the D input of flip-flop 632, and the Q output of flip-flop 632 (signal DONEVCO) is coupled to the D input of synchronizer 614.

During operation, a positive assertion (e.g., high) of PS_ON enables the down counter 610 and, through synchronizer 634, enables the up counter 630. In one embodiment, the frequency of FIXED_CLK is higher than the one-half of the variable frequency of VCO_CLK. In one example, the frequency of FIXED_CLK is 32 MHz and the frequency of the VCO_CLK ranges from 68 MHz for low levels of VIN to 36 MHz for higher levels of VIN. Because VCO_CLK has a higher frequency than FIXED_CLK, the up counter (which counts pulses of VCO_CLK) is an n-bit up counter and the down counter is an m-bit down counter, where n is greater than m. In one example, n is 6 bits and m is 5 bits. The VCO_CLK counts twice as many clock cycles because counter 630 has one more bit than counter 610.

At low levels of VIN (e.g., below 10 V in the example of FIG. 3), the frequency of VCO_CLK will be high enough that the up counter 630 will cause DONE and DONEVCO to be logic 1 before the down counter 610 reaches its terminal count value (0). DONEVCO being forced high by D flip-flop 632 is provided to the D input of synchronizer 614 and through the D flip-flop 616, causes DONE_RISE to be pulsed high. The output of OR gate 612 (LOAD) also pulses high at that point, thereby causing the down counter 610 to be reloaded. As long as VIN is at a low enough level that the up counter 630 reaches its terminal count before the down counter does so, then the down counter 610 will not reach its terminal count value. In this situation, the NON ZERO output of the down counter 610 remains logic high and, through synchronizer 620, PSON_OPP remains logic high.

At higher levels of VIN (e.g., greater than 10 V in the example of FIG. 3), the frequency of VCO_CLK becomes low enough that the down counter 610 will reach its terminal count value before the up counter 630 does so. When the down counter 610 reaches its terminal count value (e.g., 0), the NON ZERO output transitions from logic high to logic low. Upon the next pulse of VCO_CLK, the synchronizer 620 forces PSON_OPP low. Then, when the up counter 630 eventually reaches its terminal value, DONE is forced high, which forces DONEVCO high through D flip-flop 632, thereby (through synchronizer 614, D flip-flop 616, AND gate 617, and OR gate 612) causing the down counter to be reloaded at which point NON ZERO is forced high again.

The length of time that PSON_OPP is low is a function of the difference in frequency between the FIXED_CLK and the VCO_CLK.

Figure 7:
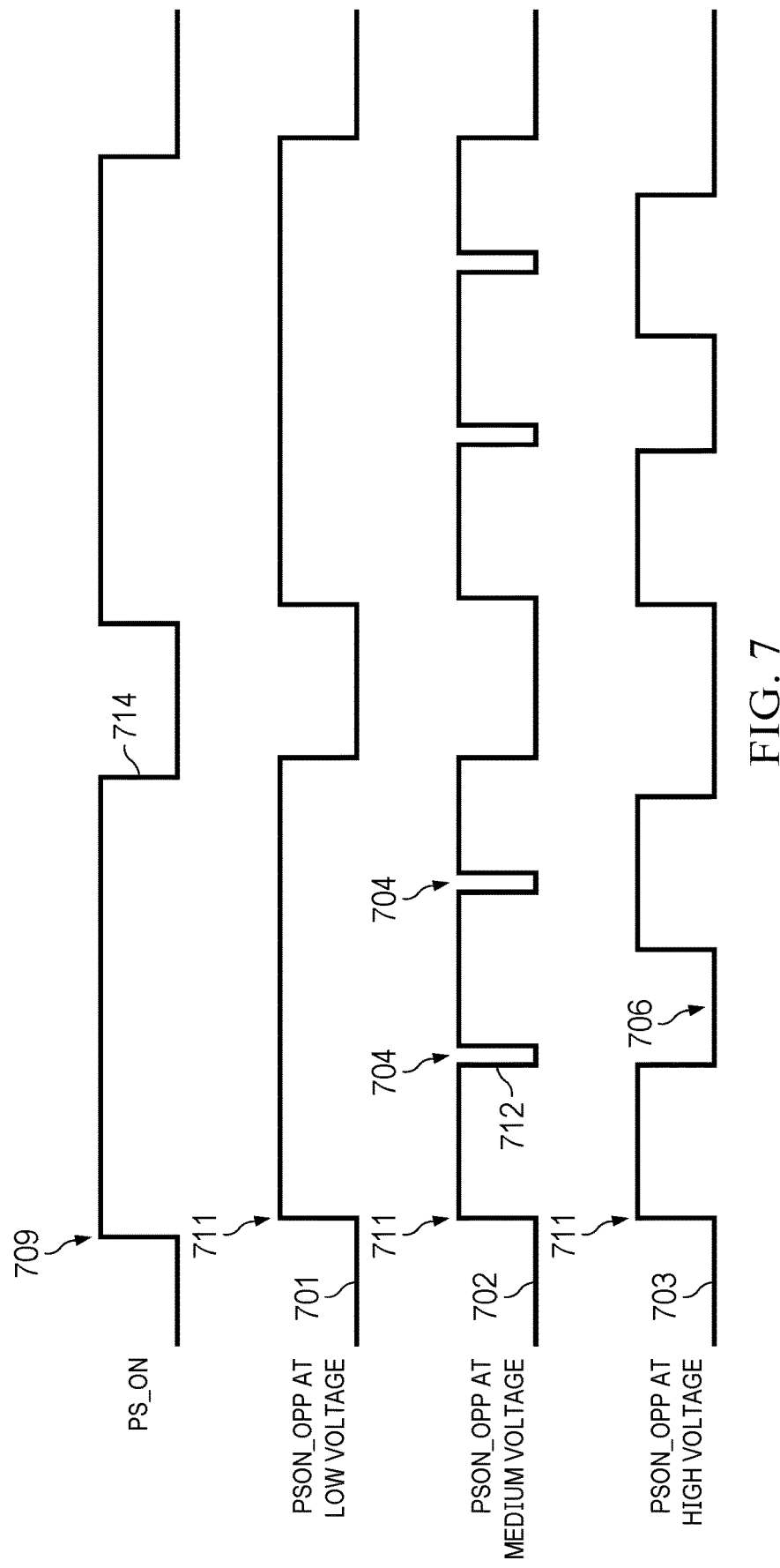
FIG. 7 is a timing diagram illustrating the operation of the over-power protection circuit in the described embodiments.

FIG. 7 shows an example timing diagram including PS_ON and three examples of PSON_OPP 701, 702, and 703. PSON_OPP 701 corresponds to a relatively low VIN (e.g., below 10 V). In this situation, PSON_OPP generally is equivalent to PS_ON. The delay between edges of PS_ON and PSON_OPP is a function of the propagation delays through the logic shown in FIG. 6. PSON_OPP 702 and PSON_OPP 703 are two examples of PSON_OPP at two different levels of VIN for the situation in which VIN is a higher value for which extra OFF time is added to avoid large maximum output power capability for the converter as described above. VIN is higher for PSON_OPP 703 than for PSON_OPP 702. In all three cases, the PSON_OPP signal transitions high (rising edge 711 responsive to a rising edge 709 of PS_ON). The falling edge 712 of PSON_OPP 702 is caused by the down counter 610 as described above before the falling edge 714 of PS_ON. The timing of the falling edge 712 of PSON_OPP is indirectly a function of the magnitude of VIN. As a result, the OFF time of the converter is longer than would have been the case if only PS_ON was used to turn the converter ON and OFF. The OFF time 704 is smaller in the medium VIN case than the OFF time 706 in the higher VIN case.

Figure 8:
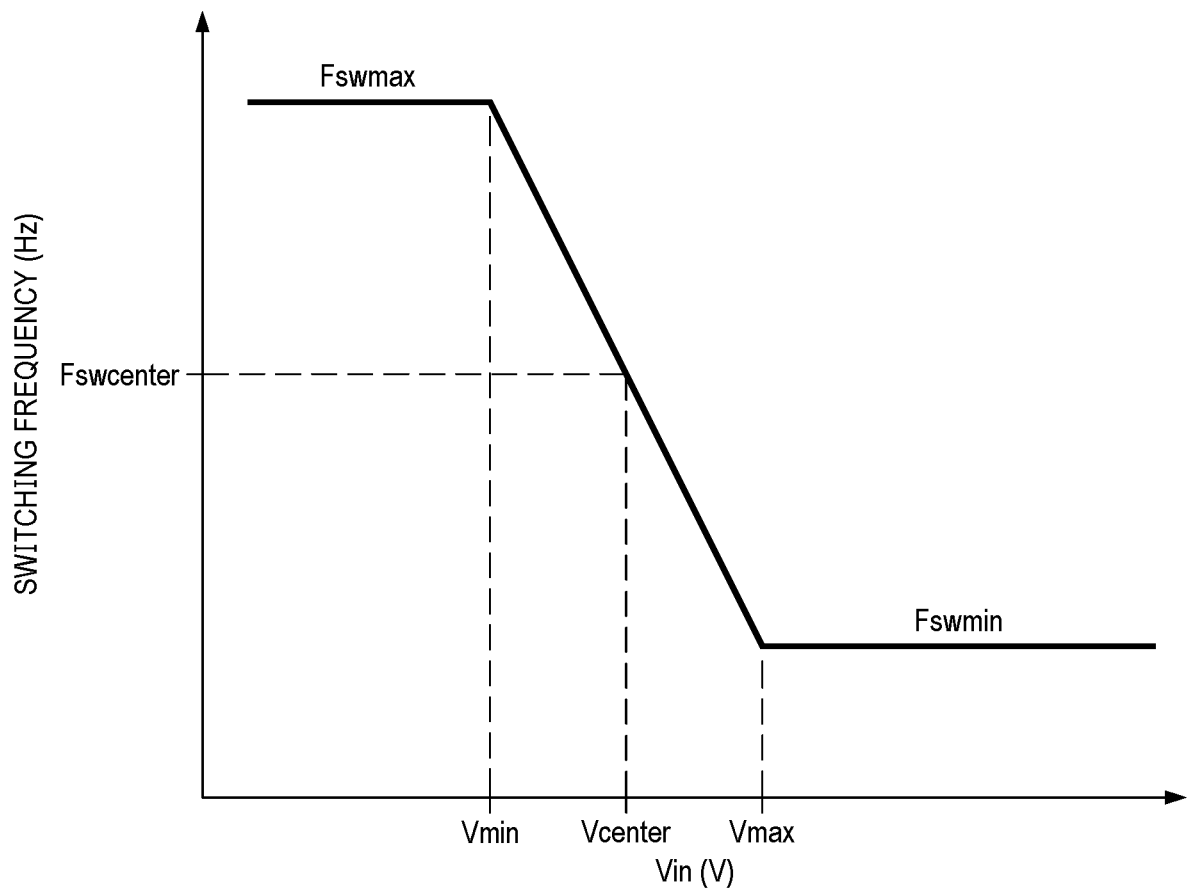
FIG. 8 is a graph illustrating another embodiment for providing a suitable switching frequency based on the magnitude of the input voltage.

FIG. 8 shows another embodiment in which at VIN below a lower threshold (Vmin) the converter implements a higher switching frequency (Fswmax). FIG. 8 also illustrates that for VIN above an upper threshold (Vmax), the converter implements a lower switching frequency (Fswmin). For VIN between the lower and upper thresholds, Vmin and Vmax, the converter implements an inverse linear relationship between VIN and the switching frequency as shown (e.g., the switching frequency decreases linearly as VIN increases). In one embodiment, VIN detect circuit 510 implements the relationship shown in FIG. 8. Current mirror MIRR2 may include a clamp that limits current I3 to a maximum value when VIN is greater than Vmax and also limits I3 to a minimum value when VIN is less than Vmin.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field effect transistor (FET) (such as an NFET, a PFET), a bipolar junction transistor (BJT—e.g., NPN or PNP), insulated gate bipolar transistors (IGBTs), and/or junction field effect transistor (JFET) may be used in place of, or in conjunction with, the devices described herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

References herein to a FET being "on" means that the conduction channel of the transistor is present and drain current may flow through the transistor. References herein to a FET being "off" means that the conduction channel is not present and drain current does not flow through the FET. An "off" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated circuit. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described embodiments, and other embodiments are possible, within the scope of the claims.

What is claimed is:

1. A system, comprising:
   a control circuit having a voltage input and a control circuit output, the control circuit configured to produce a control voltage at the control circuit output having a magnitude inversely related to a magnitude of an input voltage at the input voltage input;
   a voltage-controlled oscillator (VCO) having a VCO control input and a VCO clock output, the VCO control input coupled to the control circuit output, the VCO configured to produce a VCO clock on the VCO clock output having a frequency that is a function of the control voltage; and
   a protection circuit having a first clock input, a second clock input, and a protection circuit output, the second clock input coupled to the VCO clock output, the protection circuit configured to generate a protection circuit output signal at the protection circuit output based on a difference in frequency between a clock signal at the first clock input and the VCO clock.

2. The system of claim 1, wherein the control circuit, VCO, and protection circuit are at least part of a voltage converter, and the protection circuit is configured to inversely vary a duty cycle of the voltage converter with respect to the input voltage.

3. The system of claim 2, wherein the duty cycle is based on the difference in frequency between the clock signal at the first clock input and the VCO clock.

4. The system of claim 1, wherein the protection circuit comprises:
   a first counter that includes a first clock input coupled to the first clock input; and
   a second counter that includes second clock input coupled to the VCO clock output.

5. The system of claim 4, wherein the first counter is one of an up counter or a down counter, and the second counter is the other of an up counter or a down counter.

6. The system of claim 1, wherein the control circuit includes:
   an input voltage input detection circuit having a current output, the input voltage input detection circuit configured to generate an output current at the current output that is proportional to the input voltage; and
   a VCO reference circuit having a current input coupled to the current output, the VCO reference circuit configured to generate the control voltage based on the output current.

7. The system of claim 1, wherein the control circuit is configured to:
   inversely vary the magnitude of the control voltage for a range of the input voltage between a first threshold and a second threshold;
   set the magnitude of the control voltage at a first voltage level for input voltages greater than the second threshold; and
   set the magnitude of the control voltage at a second voltage level for input voltages smaller than the first threshold.

8. The system of claim 7, wherein the first threshold is smaller than the second threshold, and the first voltage level is smaller than the second voltage level.

9. A voltage converter, comprising:
   a control circuit having a voltage input and a control circuit output, the control circuit configured to produce a control voltage at the control circuit output having a magnitude inversely related to a magnitude of an input voltage at the input voltage input;
   a voltage-controlled oscillator (VCO) having a VCO control input and a VCO clock output, the VCO control input coupled to the control circuit output, the VCO configured to produce a VCO clock on the VCO clock output having a frequency that is a function of the control voltage; and
   a protection circuit coupled to the VCO, the protection circuit configured to vary a duty cycle of the voltage converter based on the magnitude of the input voltage.

10. The voltage converter of claim 9, wherein the protection circuit includes a first clock input, and the protection circuit is configured to vary the duty cycle based on a difference in frequency between a clock signal at the first clock input and the VCO clock.

11. The voltage converter of claim 10, wherein the protection circuit comprises:
    a first counter that includes a first counter clock input coupled to the first clock input; and
    a second counter that includes second counter clock input coupled to the VCO clock output.

12. The voltage converter of claim 11, wherein the first counter is one of an up counter or a down counter, and the second counter is the other of an up counter or a down counter.

13. The voltage converter of claim 11, wherein the clock signal at the first clock input is configured to receive a clock signal having a higher frequency than a frequency of the VCO clock.

14. The voltage converter of claim 9, wherein the control circuit includes:
    an input voltage input detection circuit having a current output, the input voltage input detection circuit configured to generate an output current at the current output that is proportional to the input voltage; and
    a VCO reference circuit having a current input coupled to the current output, the VCO reference circuit configured to generate the control voltage based on the output current.

15. The voltage converter of claim 9, wherein the control circuit is configured to:
    inversely vary the magnitude of the control voltage for a range of the input voltage between a first threshold and a second threshold;
    set the magnitude of the control voltage at a first voltage level for input voltages greater than the second threshold; and
    set the magnitude of the control voltage at a second voltage level for input voltages smaller than the first threshold.

16. The voltage converter of claim 15, wherein the first threshold is smaller than the second threshold, and the first voltage level is smaller than the second voltage level.

17. The voltage converter of claim 9, wherein the voltage converter is an isolated voltage converter.

18. A circuit, comprising:
a first counter having a first enable input and first clock input;
a second counter having a second enable input and a second clock input;
a first logic circuit having a first logic circuit clock input, a first logic circuit control input, and a second logic circuit control input, the first logic circuit configured to enable the first counter responsive to a signal at the first logic circuit control input; and
a second logic circuit having a second logic circuit clock input and a second logic circuit control output, the second logic circuit control output coupled to the first control input, the second logic circuit configured to enable the second counter responsive to the signal at the first logic circuit control input, the second logic circuit configured to generate a control signal at the second logic circuit control output responsive to the second counter reaching a terminal count value.

19. The circuit of claim 18, wherein the first counter is one of an up counter or a down counter, and the second counter is the other of an up counter or a down counter.

20. The circuit of claim 18, wherein the first clock input is configured to receive a fixed frequency clock, and the second clock input is configured to receive a variable frequency clock.

\* \* \* \* \*